(12) United States Patent
Hedrington (10) Patent No.: US 11,613,180 B2
(45) Date of Patent: Mar. 28, 2023

(54) MACHINE CENTRIC CONTROL FOR COMPACTION MACHINES

(71) Applicant: Caterpillar Paving Products Inc., Brooklyn Park, MN (US)

(72) Inventor: Mathew J. Hedrington, Ham Lake, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 335 days.

(21) Appl. No.: 16/811,974

(22) Filed: Mar. 6, 2020

(65) Prior Publication Data

US 2021/0276416 A1 Sep. 9, 2021

(51) Int. Cl.
| | |
|---|---|
| *B60K 26/02* | (2006.01) |
| *E01C 19/26* | (2006.01) |
| *B60N 2/14* | (2006.01) |
| *B60N 2/75* | (2018.01) |
| *G05G 9/047* | (2006.01) |

(52) U.S. Cl.
CPC .............. *B60K 26/02* (2013.01); *B60N 2/143* (2013.01); *B60N 2/797* (2018.02); *E01C 19/26* (2013.01); *B60K 2026/024* (2013.01); *B60K 2026/027* (2013.01); *B60K 2026/029* (2013.01); *E01C 2301/30* (2013.01); *G05G 9/04788* (2013.01); *G05G 2009/04774* (2013.01)

(58) Field of Classification Search
CPC .............. B60K 26/02; B60K 2026/024; B60K 2026/027; B60K 2026/029; B60N 2/143; B60N 2/797; B60N 2/14; B60N 2/24; E01C 19/26; E01C 2301/30; G05G 9/04788; G05G 2009/04774; G05G 1/62; G05G 1/52; G05G 9/047

See application file for complete search history.

(56) References Cited

U.S. PATENT DOCUMENTS

| | | | | |
|---|---|---|---|---|
| 5,092,408 A | * | 3/1992 | Tatara | F15B 21/08 37/348 |
| 6,039,141 A | * | 3/2000 | Denny | B60N 2/14 296/190.01 |
| 7,032,703 B2 | * | 4/2006 | Wulfert | B60R 11/0235 297/344.13 |
| 7,121,608 B2 | * | 10/2006 | Billger | B60N 2/38 297/344.22 |

(Continued)

*Primary Examiner* — Darlene P Condra
(74) *Attorney, Agent, or Firm* — Schwegman, Lundberg & Woessner (57) ABSTRACT

A construction machine that frequently changes between a forward and reverse direction of movement includes a system and method for operating the machine such that rotation of the operator seat can change the direction and speed of the machine's movement to minimize disorientation by the operator. The machine can be changed from moving in the forward direction to moving in the reverse direction, without changing the position of a propel lever or joystick that is used to control the direction and speed of the machine's movement. Rotation of the seat can be used to proportionally reduce the speed of the machine as the machine nears a threshold for changing direction. The joystick can be a dual axis lever that can move along a longitudinal axis and a lateral axis. The direction of movement and speed of the machine can depend on a combination of the joystick position and seat position.

20 Claims, 4 Drawing Sheets

(56) References Cited

U.S. PATENT DOCUMENTS

| | | | | |
|---|---|---|---|---|
| 7,243,756 | B2* | 7/2007 | Muraro | E02F 9/2012 |
| | | | | 180/326 |
| 7,441,625 | B2 | 10/2008 | Ackermann | |
| 9,707,865 | B1* | 7/2017 | Buerkle | B60N 2/38 |
| 11,040,670 | B2* | 6/2021 | Carter | B60K 37/06 |
| 2004/0129488 | A1* | 7/2004 | Chernoff | B60T 7/02 |
| | | | | 180/333 |
| 2009/0012679 | A1* | 1/2009 | Prasetiawan | E02F 9/166 |
| | | | | 701/1 |
| 2014/0273785 | A1* | 9/2014 | Guillory | B60H 1/00871 |
| | | | | 454/75 |
| 2015/0204029 | A1* | 7/2015 | Born | E01C 19/26 |
| | | | | 404/84.1 |
| 2017/0088103 | A1* | 3/2017 | Klein | B60T 7/00 |
| 2018/0251955 | A1* | 9/2018 | Wynkoop | B60N 2/146 |
| 2020/0017077 | A1* | 1/2020 | Petersen | E02F 9/166 |

* cited by examiner

MACHINE CENTRIC CONTROL FOR COMPACTION MACHINES

TECHNICAL FIELD

This disclosure relates to earth moving equipment. More particularly, this disclosure relates to operating a machine, for example a compaction machine, such that a direction of movement and speed of the machine depends on a position of the operator seat and a position of the joystick.

BACKGROUND

Compaction machines, such as asphalt compactors, are used at road construction sites for material compaction. Such machines are designed to continuously switch between a forward and reverse direction of movement during a working mode. For example, the machine can switch positions every few minutes or even more frequently. An operator seat on the machine is configured to rotate so that the operator can adjust his or her position, depending on the direction the machine is moving. Typically, the operator is facing in the direction of movement.

It is preferable to avoid stopping the machine in order to rotate the operator seat. Such stop/starts can impact operational efficiency or create divots in the freshly-laid asphalt or other road material. However, the frequent switches in direction can be disorienting for the operator.

U.S. Pat. No. 7,441,625 discloses a control system for a machine in which a direction of actuation on the control lever corresponds to a traveling direction of the machine, regardless of whether the driver's seat is rotated during movement of the machine.

SUMMARY

In an example according to this disclosure, a construction machine comprises an engine configured to move the machine in a forward direction and a reverse direction during a working mode of the machine, an operator seat attached to the machine and rotatable to move the operator seat among various positions on the machine, and a dual axis lever (or joystick) attached to the operator seat and movable among various positions in a lateral direction and a longitudinal direction to move the machine at various speeds in the forward and reverse directions. The reverse direction of the machine is 180 degrees to the forward direction. A direction of movement of the machine in the forward or reverse direction can depend on a position of the operator seat, a longitudinal position of the lever and a lateral position of the lever. A speed of movement of the machine in the forward or reverse direction can depend on the position of the operator seat, and the longitudinal and lateral positions of the lever.

In another example according to the present disclosure, a control system can control a direction of movement and speed of a construction machine that moves in a forward and reverse direction during a working mode of the machine. The control system can include an operator seat attachable to the machine and rotatable to move the operator seat among various positions on the machine and a lever attached to the operator seat and movable about two axes, a first axis being a longitudinal axis, a second axis being a lateral axis, and an origin corresponding to a neutral position of the lever. The reverse direction of the machine is 180 degrees to the forward direction. A direction of movement of the machine in the forward and reverse directions can depend on a position of the operator seat, a position of the lever on the longitudinal axis, and a position of the lever on the lateral axis. A speed of movement of the machine in the forward and reverse directions can depend on the position of the operator seat and the position of the lever on the longitudinal and lateral axes.

In another example, according to the present disclosure, a method can operate a construction machine that moves in a forward and reverse direction during a working mode, the reverse direction 180 degrees relative to the forward direction, the construction machine having an operator seat and a dual-axis lever movable on a longitudinal axis and a lateral axis. The method can include positioning the seat to generally face in the forward direction and moving the machine in the forward direction by moving the lever in the forward direction. A speed of the machine can depend on a distance of the lever from neutral on the longitudinal axis. The method can further include rotating the seat at least 90 degrees to change a position of the seat from facing in the forward direction to generally facing in the reverse direction. The machine can change from moving in the forward direction to moving in the reverse direction when the seat is at an angle of approximately 90 degrees to the forward direction. The machine can decrease in speed in the forward direction as the angle increases to 90 degrees. The method can further include moving the machine in the reverse direction. Under this method, the machine can be capable of changing from the forward to reverse direction without moving the lever and instead rotating the seat.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present disclosure is directed to systems and methods for operating a mobile construction machine, such as an asphalt compactor, that frequently changes between a forward and reverse direction of movement during a working mode of operation. Such construction machines can have a rotatable seat so that the operator is able to change his or her position as the direction of movement of the machine changes. A propel lever or joystick can control the direction and speed of movement. With the design and control system described herein, rotation of the seat can also control the direction and speed of movement of the machine. This can help with a frame of reference on the joystick as the machine changes direction and thus can facilitate an easier transition for the operator. A speed of the machine can proportionally change as a function of the change in position of the operator seat. Thus, the direction of movement and the speed of the machine can depend on a combination of the lever/joystick position and seat position.

Figure 1:
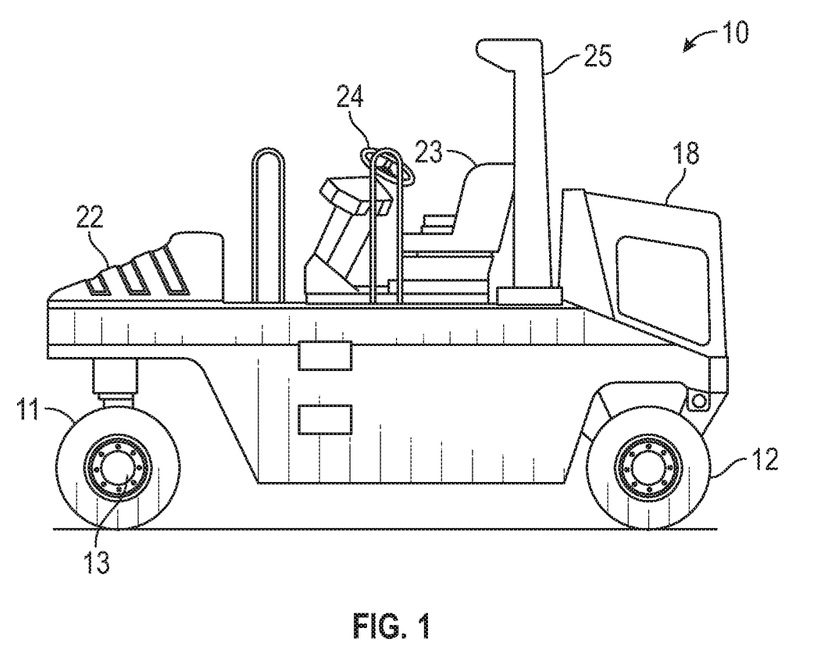
FIG. 1 is a side view of a compaction machine.

FIG. 1 illustrates an example of a construction machine 10 having a rotatable seat 23 and the operating system described herein for controlling movement of the machine relative to the seat and propel lever. In the example of FIG. 1, the construction machine 10 is a pneumatic-tire compactor, which can be used for compacting asphalt or other types of road materials.

The construction machine 10 can include a plurality of front tires 11 and rear tires 12. The front tires 11 can be supported by a front axle 13 while each pair of the rear tires 12 can be supported by an axle planetary drive and coupled to a hydraulic motor. It is also recognized that electric drive systems can be used for operating the pneumatic compactor 10.

The construction machine 10 can include an engine enclosure 18 mounted on a frame of the machine 10. An internal combustion engine can be housed within the engine enclosure 18 to provide hydraulic fluid to drive the hydraulic motors which can be enclosed by enclosure 22. The engine can drive movement of the machine 10. In addition to the rotatable operator seat 23, the construction machine 10 can include a steering wheel 24 for an operator of the machine 10 and a rollover protector 25.

The construction machine 10 can include a control system that controls operation of the construction machine 10. Such control system can include a main control unit and one or more electronic control units, such as, for example, a transmission controller, an engine controller, and a steering controller. The control system can include software, hardware, and combinations of hardware and software configured to execute a number of functions attributed to the components of the machine described herein. The control system can include analog, digital, or combination analog and digital controllers having a number of components.

As examples, the control system can include integrated circuit boards or ICB(s), printed circuit boards PCB(s), processor(s), data storage devices, switches, relays, etcetera. Examples of processors can include any one or more of a microprocessor, a controller, a digital signal processor (DSP), an application specific integrated circuit (ASIC), a field-programmable gate array (FPGA), or equivalent discrete or integrated logic circuitry.

The control system can include storage media to store and/or retrieve data or other information, for example, signals from sensors. The control system can be configured to enable communication between components of the machine via various wired or wireless communications technologies and components using various public and/or proprietary standards and/or protocols. Examples of transport mediums and protocols for electronic communication between components of the machine include Ethernet, Transmission Control Protocol/Internet Protocol (TCP/IP), 802.11 or Bluetooth, or other standard or proprietary transport mediums and communication protocols.

The construction machine 10 can be used to compact asphalt, soil or other granular materials for road construction, parking lot construction, building construction or projects that may require the ground or a supporting surface to be compacted. During compaction, the machine 10 moves in a forward and reverse direction numerous times over a given surface. The operator of the machine 10 is continuously switching positions so that he or she is generally facing in the direction the machine 10 is moving.

It is recognized that other types of compactions machines, in addition to the pneumatic compactor 10 shown in FIG. 1, can incorporate the methods and systems described herein. In another example, the compaction machine can be a drum-type compactor. Although asphalt compactors are focused on herein, the methods and systems described for controlling movement of the machine can be used on other types of construction equipment having a rotating seat and a propel lever/joystick.

Figure 2A:
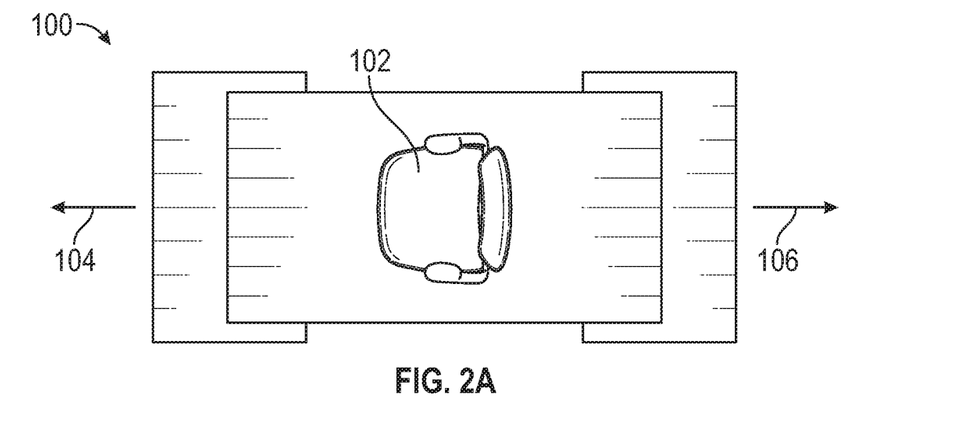
FIGS. 2A-2C are top views of a simplified design of a compaction machine including an operator seat positioned in various positions on the machine.
Figure 2B:
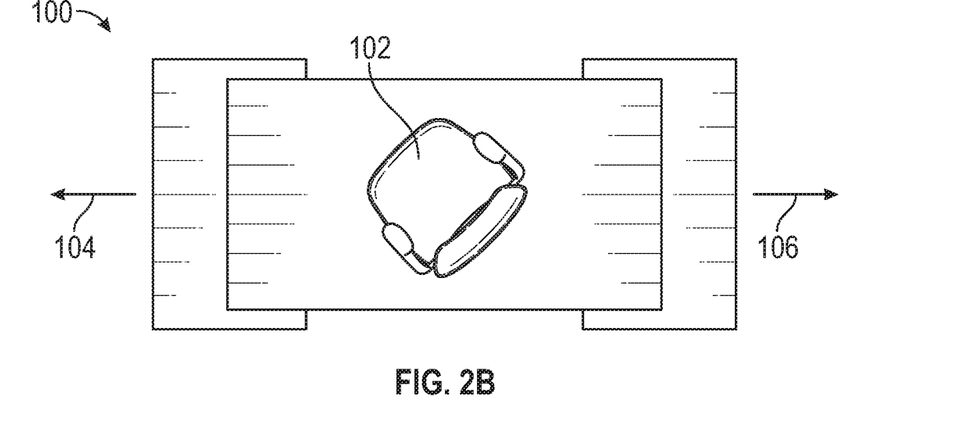
Figure 2C:
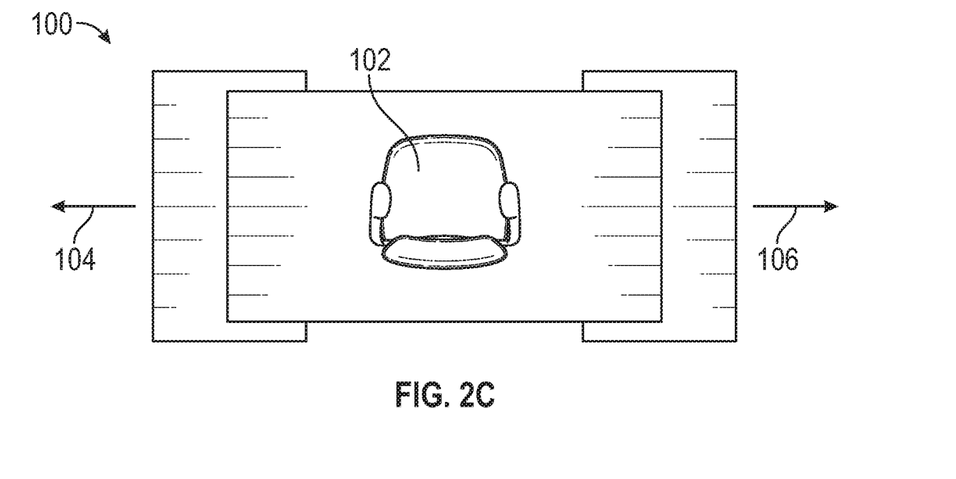

FIGS. 2A-2C are simplified views of a compaction machine 100 showing an operator seat 102 in various positions on the machine 100 to illustrate rotation of the seat 102 on the machine 100. Various components of the machine 100 are excluded in FIGS. 2A-2C and the seat 102 as shown in FIGS. 2A-2C is not to scale on the machine 100. In an example, the machine 100 can be similar in design to the machine 10 of FIG. 1.

In FIG. 2A, arrow 104 represents a forward direction of movement of the machine 100 and arrow 106 represents a reverse direction of movement of the machine 100. During a working mode of operation, the machine 100 can be restricted to only moving in the forward and reverse direction; the reverse direction is 180 degrees relative to the forward direction. For purposes herein, the forward direction (arrow 104) can also be referred to as west or a westward direction and the reverse direction (arrow 106) can also be referred to as east or an eastward direction. North and south can be defined relative to west arrow 104 and east arrow 106. The cardinal directions of north, south, east and west are used for reference herein to aid in describing the change in movement of the machine and the change in position of the operator seat relative to the machine. It does not mean that the machine 100 is limited to moving in any particular direction during operation. The machine 100 can move west to east, north to south, or at any angle therebetween.

FIG. 2A shows the seat 102 facing west. FIG. 2B shows the seat 102 facing northwest. FIG. 2C shows the seat facing north. It is recognized that the seat 102 can be orientated in any direction on the machine 100. In an example, the seat 102 can rotate 180 degrees in either direction. For example, the seat 102 can move from a westward facing direction (FIG. 2A) to an eastward facing direction by traveling north, as shown in FIGS. 2B and 2C. The seat 102 can be positioned at any northward facing angle in between westward facing (0 degrees) and eastward facing (180 degrees). The seat 102 can also move from the westward facing direction to the eastward facing direction by traveling south, and the seat 102 can be position at any southward facing angle between westward facing and eastward facing. In an example, the seat 102 can rotate 360 degrees. In an example, the seat 102 can be designed to rotate a pre-determined angle that is less than 360 degrees. In an example, the seat 102 can be designed such that the maximum rotation angle can be fixed or variable.

Figure 3A:
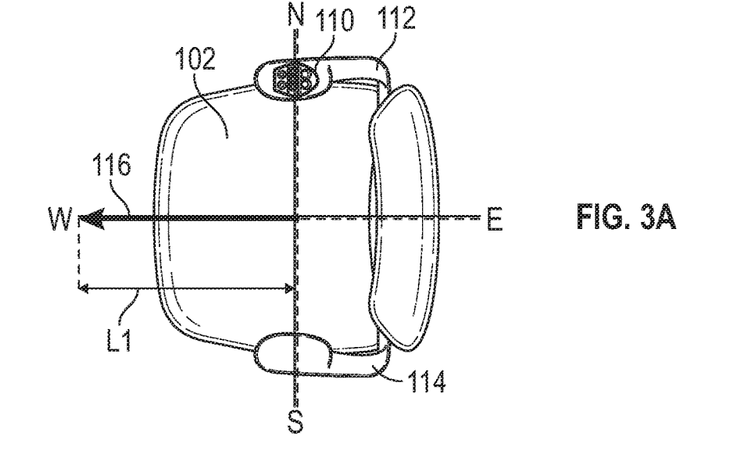
FIGS. 3A-3C are top views of the operator seat of FIGS. 2A-2C.
Figure 3B:
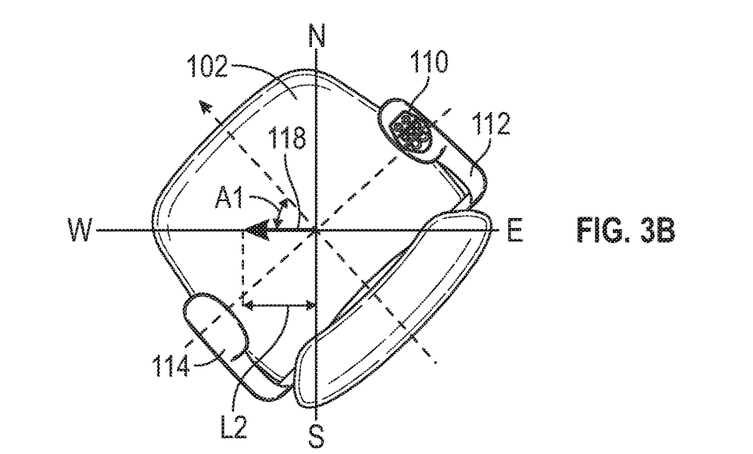
Figure 3C:
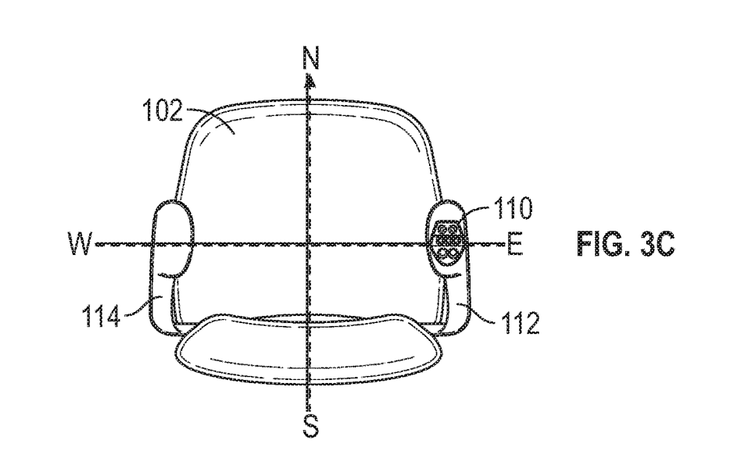

FIGS. 3A-3C show the operator seat 102 in the positions shown in FIGS. 2A-2C. A joystick or propel lever 110 can be included on a right arm 112 of the operator seat 102. Although not shown in FIGS. 3A-3C, a joystick or propel lever can be included on a left arm 114 of the seat 102 for left-handed operators. Such left-handed propel lever can be in addition to or as an alternative to the right-hand propel lever 110. In an example, the operator seat 102 can be customizable to accommodate a right or left-hand operator.

In an example, the joystick 110 can control movement of the machine 100 in the forward and reverse directions, and steering of the machine 100 can be wholly separate from the joystick 110. (The steering wheel 24 in FIG. 1 can be part of a steering system for the machine 100.) The direction and speed of movement of the machine 100 can be dependent on a position of the joystick 110 in combination with a position of the seat 102. The control system of the machine 100 can be connected to and in communication with the joystick 100 and operator seat 102 such that the control system can control the direction of movement and speed of movement of the machine 100, based on the position of the joystick 110 and the position of the operator seat 102. In an example, the control system of the machine 100 can include one or more control units for the joystick 110 and operator seat 102, and such control units can be connected to and in communication with the main control unit of the control system.

The cardinal directions—north (N), south (S), east (E), west (W)—are included in FIGS. 3A-3C as solid lines. Dotted lines in FIGS. 3A-3C are included to show the orientation of the seat 102 relative to the orientation of the machine 100. The arrow head for the dotted line represents the direction the seat 102 is facing. The dotted line arrow head is not visible in FIG. 3A because the direction of the seat 102 is the same direction as the movement of the machine 100.

As described above in the description of FIGS. 2A-2C, cardinal directions are used herein to describe movement of the seat 102 relative to the machine 100. For purposes herein, the machine 100 is oriented to face west such that a forward movement of the machine 100 is in a westward direction and a reverse movement of the machine 100 is in an eastward direction. Although the machine 100 may be described as moving west (which equates herein to moving in a forward direction), the machine 100 may not in fact be moving west and east in operation and can move forward in virtually any cardinal direction (and reverse in a direction 180 degrees to the forward direction).

The joystick 110 can include a dual-axis design. The joystick 110 can move in a forward direction and a reverse direction (as defined on a longitudinal axis), as well as to the left and to the right (as defined on a lateral axis). Such movement is all relative to a neutral position of the joystick 110, which can correspond to an origin on the coordinate system defined by the longitudinal and lateral axes. A speed of the machine 100 can depend, in part, on a distance of the joystick 110 from neutral in at least one of the longitudinal and lateral directions. Movement of the joystick 110 is described further below in reference to FIGS. 3A-3C. The design features of the joystick 110 are described below in reference to FIGS. 4A and 4B. FIGS. 3A-3C are provided to aid in the description of how a change in a position of the seat 102, a change in position of the joystick 110, or a change in both the seat 102 and joystick 110 can impact movement of the machine 100.

FIG. 3A shows the seat 102 facing forward or west (W). If the operator moves the joystick 110 all the way forward (as far away from neutral in a longitudinal direction away from the operator), the machine 100 can move in the forward direction (west) at full or maximum speed. The maximum speed of the machine 100 is represented in FIG. 3A by weighted arrow 116 having a length L1. Note that the maximum speed in the forward direction refers to a maximum working speed of the machine 100. Such maximum working speed can be different than a maximum traveling speed of the machine 100. In FIG. 3A, because the seat 102 is facing fully forward (fully west), there is no north/south displacement of the seat 102; as such, there is also no north/south displacement of the lever/joystick 110 to impact the speed of the machine 100. In an example, the operator can change the lateral position of the joystick 110 (left or right) in order to move the machine 100.

FIG. 3B shows the seat 102 facing northwest at an angle A1. The angle A1 can represent an angle of the seat 102 relative to the forward direction of movement of the machine 100. In an example, the angle A1 can be about 45 degrees. If the operator moves the joystick 110 all the way forward, the machine 100 can move in the forward direction (west) at a reduced speed. Such reduced speed (compared to the maximum speed in FIG. 3A) is represented in FIG. 3B by weighted arrow 118 having a length L2 with the difference in lengths L1 and L2 being attributed to the difference in speed of the machine 100.

When the seat 102 is facing northwest, the position of the joystick 110 is less west (compared to its position in FIG. 3A). There is a north/south displacement of the seat 102, and thereby the joystick 110, when the seat 102 is facing northwest. Thus, when the joystick 110 is moved fully forward, the machine 100 can still move in the forward direction, but at a reduced speed, if the joystick 110 is not modified in a lateral direction (left/right). The reduction in speed of the machine 100 can be proportional to the north/south displacement of the seat 102 and joystick 110. If the seat 102 is moved to an angle greater than 45 degrees and less than 90 degrees, the reduction in speed is proportional to the change in angle. As further described below, the speed of the machine 100 can be modified by changing a left/right position of the joystick 110 relative to neutral.

FIG. 3C shows the seat 102 facing fully north. If the operator moves the joystick 110 all the way forward, the machine 100 can be prohibited from moving forward. Because the seat 102 is facing fully north, the position of the joystick is north and there is no west/east displacement of the seat 102 or joystick 110. Thus, the joystick 110 can be moved fully forward and the machine can remain stopped. Because the machine 100 is not moving when the seat 102 is in this position, there is no weighted arrow in FIG. 3C.

In FIG. 3A, the angle A1 is approximately 0 degrees. In FIG. 3B, the angle A1 is approximately 45 degrees. In FIG. 3C, the angle A1 is approximately 90 degrees. In an example, the angle A1 can be any angle including and between 0 and 90 degrees, since the operator can adjust the seat 102 to any of those positions. The angle A1 can also be greater than 90 degrees. The seat 102 can be moved to a northeast position. For example, the angle A1 can be approximately 135 degrees when the seat 102 is in a northeast position. The seat 102 can also be moved to a position facing fully east, which equates to the angle A1 being equal to approximately 180 degrees. The angle A1 can be any angle including and between 90 and 180 degrees.

The machine 100 operates the same, in terms of movement and speed, when the seat 102 is in a northeast and east facing position as described above for the seat 102 in the northwest and west facing positions. The northeast facing position of the seat 102 is a combination of north/south and east/west displacement and thus the speed of the machine 100 in the reverse direction is less than the maximum working speed, when the joystick 110 is pushed fully forward (or a maximum distance from neutral in a longitudinal direction) and the left/right position of the joystick 110 is not adjusted. When the seat 102 is in the east facing or reverse direction, the machine 100 can move at a maximum working speed in the reverse (east) direction, if the joystick 110 is pushed fully forward (as far from neutral in a longitudinal direction), since there is no north/south displacement of the position of the seat 102 to contribute to a reduction in the speed of the machine 100.

For purposes herein, when the seat 102 is facing northwest or southwest, for example at an angle of about 45 degrees, such position can be considered as generally facing west or generally facing in the forward direction of machine movement; similarly, when the seat 102 is facing northeast and southeast, such position can be considered as generally facing east or generally facing in the reverse direction of machine movement.

The paragraphs above in reference to FIGS. 3A-3C describe how the machine 100 can move starting from a stopped position. Next, a description is provided of how the machine 100 can transition from moving in a forward (west) direction to moving in a reverse (east) direction, as the operator moves his or her seat 102 from facing west (FIG. 3A) to facing east.

The machine 100 can be designed to do numerous passes in the forward and reverse directions, during a working operation of the machine 100, in order to compact the asphalt or other road material. It can be important to avoid stopping the machine 100 as the machine 100 changes from the forward to reverse direction (and vice versa). At the same time, it can be important for the operator to adjust his or her seat 102 as quickly as possible when the machine 100 changes direction. Such change in seat position can be disorienting for the operator. The systems and methods described herein can help minimize such disorientation by making the position of the joystick 110 more intuitive to the desired direction of movement of the machine 100. The change in speed of the machine 100, as a function of the position of the seat 102, can also help as the machine 100 changes direction.

In an example, the machine 100 can change from moving forward at a maximum working speed to moving in the reverse direction at the maximum working speed. Given the design of the seat 102 and joystick 110 described herein, this can be achieved without changing a position of the joystick 110 and moving the seat 102 from a fully forward-facing direction (FIG. 3A) to a fully reverse-facing direction (FIG. 3B). As the operator starts rotating the seat 102 in a northward direction, the machine 100 can slow down as a function of the increase in the angle A1. Such reduction in working speed can continue as the angle A1 increases from 0 to 90 degrees. The north facing position of the seat 102 (the angle A1 equal to 90 degrees) in FIG. 3B can represent a threshold at which the machine 100 stops and changes its direction of movement. Once the seat 102 crosses such threshold and is at a position in which the angle A1 is greater than 90 degrees, the machine 100 begins movement in the reverse (east) direction. The speed in the reverse direction increases proportionally with the increase in the angle A1. At a seat position facing fully-east, the machine 100 can return to a maximum working speed. This description is based on no change in the position of the joystick 110 relative to the operator seat 102. Thus, the operator seat 102 can be used to change the direction and speed of movement of the machine 100, while maintaining the joystick 110 in the same position. As described below, the joystick 110 can be moved, in addition to or as an alternative to the operator seat 102, to impact the direction of movement and speed of the machine 100.

To change the machine 100 from moving in the forward (west) direction to the reverse (east) direction, the operator can alternatively (1) move the joystick 110 and not move the seat 102, or (2) move the joystick 110 and then move the seat 102. As an example, if the machine 100 is moving in the forward direction with the joystick 110 in a longitudinal position away from the operator (relative to neutral), the operator can move the joystick 110 to the reverse direction by passing through neutral and then toward the operator in the longitudinal direction. Such change in the position of the joystick 110 can cause the machine 100 to switch from the forward direction of movement to the reverse direction of movement. The speed of movement in the reverse direction can depend on how far the joystick 110 is from neutral. If the machine 100 is intended to be in reverse for only a brief period, the operator may choose not to move the seat 102 and rely on the position of the joystick 110 to change the direction of movement. The operator can also move the seat 102 after the joystick 110 is moved into reverse—this option is described further below.

In an example, the operator seat 102 can be locked or otherwise secured from unintended rotation. Such locking system can be operated, for example, using one or more buttons on the joystick 110. The operator can lock the seat position once he or she is in the desired position by pushing a button on the joystick 110. The operator can then push the same or a different button to unlock the seat position when the operator wants to change the seat position.

In the systems and methods of the present application, the direction of movement of the machine 100 can be changed (from forward to reverse or vice-versa) without moving the joystick 110 and by rotating the seat 102. The joystick 110 can remain facing in the direction of movement of the machine 100, if the operator chooses to use the seat 102 to change the direction of movement. Starting from a west facing position (FIG. 3A), there can be a proportional reduction in speed as the operator seat 102 rotates to a north facing position. As the seat 102 crosses the north facing threshold (FIG. 3B), the machine 100, which has already been reduced to a slow speed, can change directions. As the seat 102 moves to an east facing position (FIG. 3C), the speed can proportionally increase. Again, this description assumes no change in position of the joystick 110. The position of the joystick 110 can be changed as an alternative to moving the seat 102 or in combination with moving the seat 102.

After performing the pass in the reverse (east) direction, the machine 100 can switch back to moving in the forward (west) direction. Such switch can be performed by moving the seat 102 and without moving the joystick 110. The process for switching back to the forward direction can be the same as described above for switching from forward to reverse. The seat 102 can move from the angle A1 equal to about 180 degrees to the angle A1 equal to about 0 degrees. The speed of the machine 100 in the reverse direction decreases as the seat 100 moves from east to north. As the seat 102 passes over the threshold (the angle A1 equal to about 90 degrees), the machine 100 changes from moving in the reverse direction to moving in the forward direction. The speed of the machine 100 in the forward direction increases as the seat 102 moves from north facing to west facing.

The working speed of the machine 100 is described above as being at a maximum working speed, which equates to the joystick 110 being as far forward from neutral as possible (maximum distance). The machine 100 is described above as changing from a maximum speed in the forward direction to a maximum speed in the reverse direction. It is recognized that the proportional reduction in speed that happens with rotation of the seat 102 can apply when the machine 100 is operating at a working speed less than the maximum, which equates to the joystick 110 being a distance from neutral less than the maximum distance.

The transition of the machine 100 is described above in the context of moving the seat 102 from facing west (FIG.

3A) to facing east, traveling in a north direction. In an example, the operator may choose to sit in a northwest position during operation in the forward (west) direction and in a northeast position during operation in the reverse (east) direction. As such, the operator seat 102 may only rotate about 90 degrees to change the machine 100 from forward movement to reverse movement.

The machine 100 can alternatively switch from the west direction to the east direction by traveling in a south direction. It is recognized that the operator can generally change a position of the seat 102 from any west facing position—including fully west (FIG. 3A), northwest (FIG. 3B), southwest—to any east facing position—including fully east, northeast, and southeast, depending in part on a rotation capability of the seat 102 (for example, 180 seat, 270 seat, 360 seat, etc.).

FIGS. 3A-3C describe a change in the direction and speed of movement of the machine 100 as a function of the position of the seat 102, without changing the position of the joystick 110. However, the position of the joystick 110 can be changed during operation and such change in joystick position, either as an alternative to or in combination with a change in seat position, can change the speed of the machine 100.

When the seat 102 is facing fully west or fully east, a speed of the machine 100 in the forward or reverse direction can depend on how far forward the joystick 110 is positioned (i.e. the joystick's distance from neutral in a longitudinal direction). If the joystick 110 is positioned fully forward, the machine 100 can move at maximum working speed. As described above, as the seat 102 moves to a northwest or northeast position, if the joystick 110 position is unchanged, the machine 100 slows down due to the displacement of the seat 102 in the north/south direction. If the seat 102 is to remain in a northwest position, the joystick 110 can be moved fully west (left) to compensate for the north/south displacement. Moving the joystick 110 as far left from neutral as possible (in a lateral and longitudinal direction) can result in the machine 100 returning to maximum working speed in the forward direction. Similarly, if the seat 102 is to remain in a northeast position, the joystick 110 can be moved east (right) to compensate for the north/south displacement. For the northeast position, if the joystick 110 is moved as far right from neutral as possible (in a lateral and longitudinal direction), the machine 100 can return to maximum working speed in the reverse direction. Similar changes can be made to the joystick 110 if the seat 102 moves from fully east to a southeast position or fully west to a southwest position.

In sum, the direction of travel and speed of travel of the machine 100 can be based on the position of the operator seat 102 and the position of the joystick 110 (relative to neutral). In an example, and as described in detail above, the operator can use rotation of the seat 102 to change the direction of movement of the machine 100, while the joystick 110 position (relative to neutral) is unchanged. In another example, the operator can use the joystick 110 to change the direction of movement of the machine 100, while the seat 102 position is unchanged. In other examples, the direction of movement of the machine 100 can be changed using a combination of rotating the seat 102 and moving the joystick 110. The option selected can depend, for example, on operator preference, working conditions, efficiency, etc.

Movement of the joystick 110 is not limited to movement in either the longitudinal direction (fore/aft) or the lateral direction (left/right). Given the dual axis design of the joystick 110, these degrees of freedom can be combined and movement of the joystick 110 can be in both a longitudinal and lateral direction at the same time. For example, if the seat 102 is facing northeast, to move full speed in the reverse (east) direction, the operator can push the lever east (right), which is a combination of lateral and longitudinal displacement.

The operator may use the joystick 110 to initially change the direction of movement of the machine 100 (for example, from forward to reverse) and then rotate the operator seat 102. In that scenario, the operator can move the joystick 110 as far in the other direction as it is capable, such that the machine 100 can slow down and switch to the reverse direction of travel. Because the joystick 110 is all the way in the reverse direction (fully east), the machine 100 can accelerate to the maximum working speed so long as the operator does not rotate the seat 102. Note that at this point the joystick 110 is facing in the direction that the machine 100 is traveling (east), but the seat 102 is not since the seat 102 is still facing west. If the operator chooses to rotate the seat 102 (to face east), as the seat begins to rotate, the operator can adjust the joystick 110 to keep it as far east as possible by adding a lateral component to the position of the joystick 110. As the seat 102 rotates and passes north, the joystick 110 would still be facing east, but that now means fully lateral "right". As the seat 102 continues to rotate, there is a reduction in lateral displacement and an increase in longitudinal displacement until the seat 102 is facing east and the joystick 110 is fully away from operator in the longitudinal direction (relative to neutral), which is still fully east. This method may be used to decrease the time for the machine 100 to get back up to the maximum working speed in the new direction, as compared to the option in which rotation of the seat 102 is used solely to change the direction of travel.

Figure 4A:
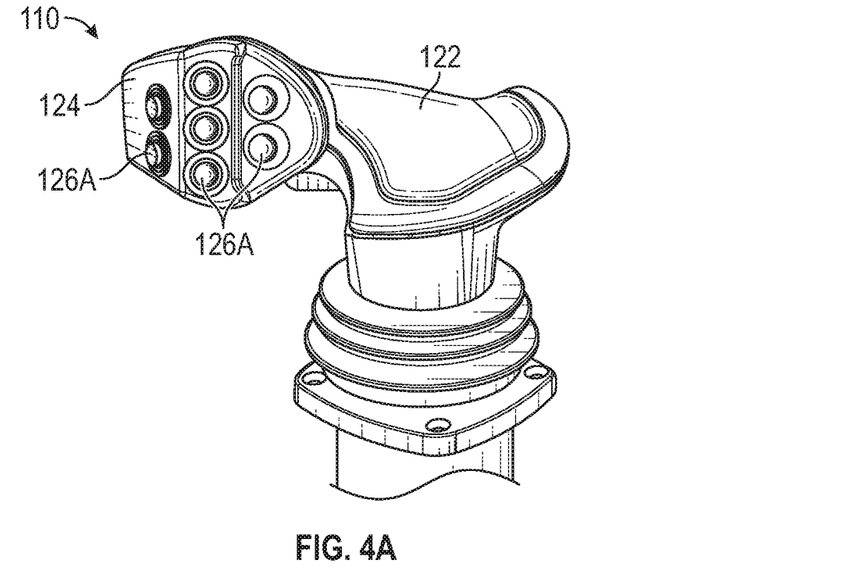
FIG. 4A is a perspective view a lever/joystick for use in a compaction machine.
Figure 4B:
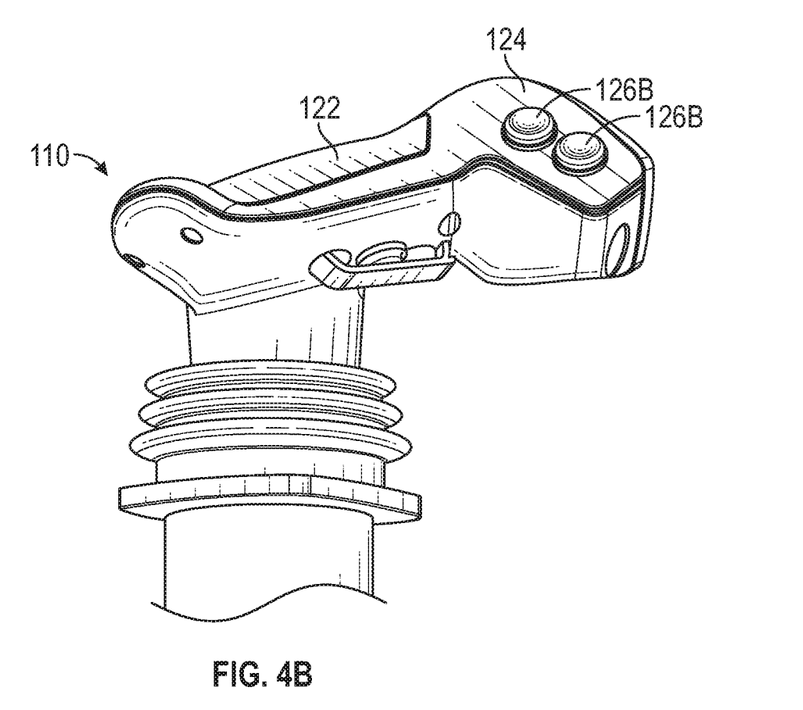
FIG. 4B is a perspective view of an opposing side of the joystick of FIG. 4A.

FIGS. 4A and 4B show opposing sides of the dual-axis joystick 110. It is recognized that this is one example of a design for the joystick 110. Other designs, which have the functionality provided above in reference to FIGS. 3A-3C, can be used as an alternative or in addition to the joystick design shown in FIGS. 4A and 4B. These designs may have a different structure or different features than what is shown in FIGS. 4A and 4B. The joystick 110 of FIGS. 4A and 4B is configured for a righted handed operator. In an example, the seat 102 in FIGS. 3A-3C can be designed with a joystick on the left arm 114 of the seat 102, such left arm joystick can be in addition or as an alternative to the joystick 110 on the right arm 112.

FIG. 4A shows a left-side of the joystick 110. The joystick 110 can include a hand rest 122 for the operator to rest his or her palm on and a finger portion 124 that can include multiple buttons 126. The operator can wrap his or her fingers around the finger portion 124. In an example, the joystick 110 can be designed such that the operator uses his or her thumb for buttons 126A on a left side of the finger portion 124 and his or her index finger for buttons 126B on a right side of the finger portion 124. The buttons 126A and 126B can be configured to activate (and deactivate) various features of the compaction machine 100. For example, the buttons 126A and 126B can include, but are not limited to, seat slide and seat rotate, water spray, implement control, such as edge cutter, and vibratory systems. In other examples, the joystick 110 can include more or less buttons 126A and 126B on the finger portion 124 than what is shown in FIGS. 4A and 4B.

As described above, the joystick 110 is a dual axis joystick with two degrees of freedom for changing a position of the joystick 110, relative to a longitudinal axis and a lateral axis. An example of a commercial joystick usable as the joystick 110 is the family of PLUS+1® joysticks from Danfoss.

INDUSTRIAL APPLICABILITY

The systems and methods described herein for changing a direction of movement of mobile construction equipment can be used in a variety of applications, including, but not limited to, road construction. Such road construction equipment can include compaction machines—for example, asphalt compactors. During compaction, the operator frequently switches the machine between moving in forward and reverse. The operator seat on the machine can be rotatable so that the operator can switch the seat position with the change in movement of the machine. As such, the operator can be facing in the direction the machine is moving. The systems and methods described herein can assist the operator in switching the movement direction of the machine in a manner to minimize disorientation for the operator and minimize stopping/slowing down of the machine.

The direction of movement of the machine can be dependent on a position of the dual axis joystick (in a lateral direction and a longitudinal direction) in combination with a position of the seat. The system can be configured to switch the direction of movement of the machine by rotating the seat and without moving the joystick. The joystick can remain facing in the direction of movement of the machine. As the seat rotates, a speed of the machine can increase or decrease as a function of the seat position. In combination with rotation of the seat, the position of the joystick can be changed on at least one of a longitudinal axis or a lateral axis to increase or decrease a speed of the machine. Depending on operator preference and working conditions, the joystick can be used to switch the direction of movement of the machine and the seat can optionally be rotated.

Various examples are illustrated in the figures and foregoing description. One or more features from one or more of these examples may be combined to form other examples.

The above detailed description is intended to be illustrative, and not restrictive. The scope of the disclosure should, therefore, be determined with references to the appended claims, along with the full scope of equivalents to which such claims are entitled.

What is claimed is:

1. A construction machine comprising:
   an engine configured to move the machine in a forward direction and a reverse direction during a working mode of the machine, and the reverse direction is 180 degrees to the forward direction;
   an operator seat attached to the machine and rotatable to move the operator seat among various positions on the machine; and
   a dual axis lever attached to the operator seat and movable among various positions in a lateral direction and a longitudinal direction to move the machine at various speeds in the forward and reverse directions,
   wherein a direction of movement of the machine in the forward or reverse direction is responsive to and is controlled by a position of the operator seat, a longitudinal position of the lever, and a lateral position of the lever, and
   wherein a speed of movement of the machine in the forward or reverse direction is responsive to and is controlled by the position of the operator seat, and the longitudinal and lateral positions of the lever.

2. The construction machine of claim 1 comprising:
   a control system configured to control the direction of movement and speed of the machine as a function of the position of the operator seat and the lateral and longitudinal positions of the lever.

3. The construction machine of claim 2, wherein the control system reduces the speed of movement of the machine when the operator seat is positioned at an angle more than zero degrees and less than 90 degrees to the direction of movement in the forward or reverse direction, if the lateral and longitudinal positions of the lever remain unchanged during rotation of the operator seat.

4. The construction machine of claim 1, wherein the lever is attached to a right arm of the operator seat.

5. The construction machine of claim 1, wherein the lever is attached to a left arm of the operator seat.

6. The construction machine of claim 1, wherein the operator seat is rotatable at least 90 degrees in either direction from a starting position.

7. The construction machine of claim 1, wherein the operator seat is rotatable 180 degrees in either direction from a starting position.

8. The construction machine of claim 1, wherein the machine is a compactor.

9. The construction machine of claim 1, wherein the machine is a piece of earth moving equipment.

10. A control system for controlling a direction of movement and speed of a construction machine that moves in a forward and reverse direction during a working mode of the machine, the reverse direction being 180 degrees to the forward direction, the control system comprising:
    an operator seat attachable to the machine and rotatable to move the operator seat among various positions on the machine; and
    a lever attached to the operator seat and movable about two axes, a first axis being a longitudinal axis, a second axis being a lateral axis, and an origin corresponding to a neutral position of the lever,
    wherein a direction of movement of the machine in the forward and reverse directions is responsive to and is controlled by a position of the operator seat, a position of the lever on the longitudinal axis, and a position of the lever on the lateral axis, and
    wherein a speed of movement of the machine in the forward and reverse directions is responsive to and is controlled by the position of the operator seat and the position of the lever on the longitudinal and lateral axes.

11. The control system of claim 10, wherein the control system prevents movement of the machine when the operator seat is positioned in one or more predetermined positions on the machine and the lever is positioned in one or more predetermined positions.

12. The control system of claim 10, wherein the control system reduces the speed of movement of the machine when the operator seat rotates to an angle more than zero degrees and less than 90 degrees to the forward and reverse directions of the machine, if the position of the lever on the lateral and longitudinal axes remain unchanged during rotation of the operator seat.

13. The control system of claim 12, wherein the reduction in speed is proportional to the angle, and the control system continues to reduce the speed of movement as the operator seat rotates and the angle increases.

14. The control system of claim 10, wherein the lever is attached to the operator seat.

15. A method of operating a construction machine that moves in a forward and reverse direction during a working mode, the reverse direction 180 degrees relative to the forward direction, the construction machine having an operator seat and a dual-axis lever movable on a longitudinal axis and a lateral axis, the method comprising:
- positioning the seat to generally face in the forward direction;
- moving the machine in the forward direction by moving the lever in the forward direction, a speed of the machine depending on a distance of the lever from neutral on the longitudinal axis;
- rotating the seat at least 90 degrees to change a position of the seat from facing in the forward direction to generally facing in the reverse direction, the machine changing from moving in the forward direction to moving in the reverse direction when the seat is at an angle of approximately 90 degrees to the forward direction, and the machine decreases in speed in the forward direction as the angle increases to 90 degrees; and
- moving the machine in the reverse direction,
- wherein the machine is capable of changing from the forward to reverse direction without moving the lever and instead in response to and controlled by rotating the seat.

16. The method of claim 15 further comprising:
rotating the seat back to generally facing in the forward direction to repeat moving the machine in the forward direction.

17. The method of claim 15 further comprising:
adjusting the lever on at least one of the lateral axis or longitudinal axis to increase or decrease the speed of the machine in the reverse direction.

18. The method of claim 17, wherein adjusting the lever is performed before, after or simultaneous to rotating the seat.

19. The method of claim 15, wherein rotating the seat at least 90 degrees includes rotating the seat approximately 180 degrees to move the seat from facing in a first direction corresponding to the forward movement of the machine to facing in a second direction corresponding to the reverse movement of the machine.

20. The method of claim 15, wherein positioning the seat to generally face in the forward direction includes positioning the seat such that the angle is approximately 45 degrees to the forward direction, and rotating the seat at least 90 degrees includes rotating the seat approximately 90 degrees to move the seat to a second angle that is approximately 45 degrees to the reverse direction.

* * * * *